(12) United States Patent
Byrne

(10) Patent No.: US 10,666,603 B2
(45) Date of Patent: May 26, 2020

(54) OPTIMIZING ROUTING OF ACCESS TO NETWORK DOMAINS VIA A WIRELESS COMMUNICATION NETWORK

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 211 days.

(21) Appl. No.: 15/649,298

(22) Filed: Jul. 13, 2017

(65) Prior Publication Data

US 2019/0020620 A1 Jan. 17, 2019

(51) Int. Cl.
*H04L 29/12* (2006.01)

(52) U.S. Cl.
CPC ...... *H04L 61/1511* (2013.01); *H04L 61/6009* (2013.01); *H04L 61/6059* (2013.01)

(58) Field of Classification Search
CPC . H04L 67/322; H04L 67/327; H04L 61/6059; H04L 67/101; H04L 67/1004; H04L 61/1511; H04L 61/6009
See application file for complete search history.

(56) References Cited

U.S. PATENT DOCUMENTS

| | | | | |
|---|---|---|---|---|
| 6,178,160 B1* | 1/2001 | Bolton | ................... | H04L 29/06 370/255 |
| 7,086,061 B1* | 8/2006 | Joshi | ................ | H04L 29/12066 718/105 |
| 7,574,508 B1* | 8/2009 | Kommula | ......... | H04L 29/12066 709/226 |
| 9,578,567 B1* | 2/2017 | Laganier | ............. | H04L 41/0668 |
| 2002/0087722 A1* | 7/2002 | Datta | ................ | H04L 29/12066 709/239 |
| 2007/0124487 A1* | 5/2007 | Yoshimoto | ........ | H04L 29/12066 709/230 |
| 2008/0071925 A1* | 3/2008 | Leighton | ........... | H04L 29/12066 709/241 |
| 2012/0226734 A1* | 9/2012 | Poese | .................. | H04L 61/1511 709/201 |
| 2015/0095499 A1* | 4/2015 | Noldus | ............... | H04L 61/1511 709/226 |
| 2015/0098333 A1* | 4/2015 | Lin | ....................... | H04L 67/101 370/235 |
| 2015/0222536 A1* | 8/2015 | Bergman | ................ | H04L 43/16 709/224 |

(Continued)

*Primary Examiner* — Jerry B Dennison
(74) *Attorney, Agent, or Firm* — Lee & Hayes P.C.

(57) ABSTRACT

A wireless communication network includes a Domain Name System (DNS) caching server. The DNS caching server receives a request from a client device to access a network site and queries one or more DNS servers for potential Internet Protocol (IP) addresses for accessing the network site. The DNS caching server receives, from the one or more DNS servers, a plurality of IP addresses for accessing the network site and evaluates the plurality of IP addresses. Based at least in part upon the evaluating, the DNS caching server selects an IP address from the plurality of IP addresses and provides the IP address to the client. The DNS caching server may be located some place other than the wireless communication network and perform the same functions for client devices not accessing the wireless communication network.

20 Claims, 3 Drawing Sheets

(56) References Cited

U.S. PATENT DOCUMENTS

| | | | |
|---|---|---|---|
| 2016/0063027 A1* | 3/2016 | Brand | G06F 16/178 |
| | | | 707/620 |
| 2016/0212204 A1* | 7/2016 | Huang | H04L 61/1511 |
| 2016/0308818 A1* | 10/2016 | Torres | H04L 67/2842 |
| 2017/0207989 A1* | 7/2017 | Cai | H04L 61/1511 |
| 2017/0264541 A1* | 9/2017 | Nakagoe | H04L 43/08 |
| 2017/0280386 A1* | 9/2017 | Xu | H04W 52/0212 |
| 2018/0278570 A1* | 9/2018 | Dhanabalan | H04L 61/2007 |
| 2018/0295094 A1* | 10/2018 | White | H04L 61/1511 |
| 2018/0331943 A1* | 11/2018 | Shah | H04L 43/026 |
| 2018/0331945 A1* | 11/2018 | Attarwala | H04L 45/124 |
| 2018/0331946 A1* | 11/2018 | Olofsson | H04L 45/302 |
| 2019/0020620 A1* | 1/2019 | Byrne | H04L 61/1511 |
| 2019/0097965 A1* | 3/2019 | Linari | H04L 61/1511 |

* cited by examiner

OPTIMIZING ROUTING OF ACCESS TO NETWORK DOMAINS VIA A WIRELESS COMMUNICATION NETWORK

BACKGROUND

In recent years, telecommunication devices have advanced from offering simple voice calling services within wireless communication networks to providing users with many new features. Telecommunication devices now provide messaging services such as email, text messaging, and instant messaging; data services such as Internet browsing; media services such as storing and playing a library of favorite songs; location services; and many others. Thus, telecommunication devices, referred to herein as user devices or mobile devices, are often used in multiple contexts. In addition to the new features provided by the telecommunication devices, users of such telecommunication devices have greatly increased. Such an increase in users is only expected to continue and in fact, it is expected that there could be a growth rate of twenty times more users in the next few years alone.

Wireless communication networks generally provide services to users via a plurality of nodes or servers. One such service is access to a network site, e.g., a website, that is accessible via a network, e.g., the Internet. In order to access the website, the wireless communication network needs to know an Internet Protocol (IP) address that provides access to the website. Generally, access to the website may be provided over multiple IP addresses. A domain name system (DNS) server includes the information for the IP addresses for accessing the website.

A wireless communication network may include multiple DNS caching servers that cache information relating to the IP addresses for accessing the website. However, the DNS server and/or the owner of the website may provide different IP addresses to different DNS caching servers, resulting in different routing paths and/or different networks for accessing the website. Thus, the IP addresses in the DNS caching servers of the wireless communication network may not be optimal for accessing the website in comparison to IP addresses provided to other DNS caching servers of the other service providers, e.g., Internet Service providers (ISPs).

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
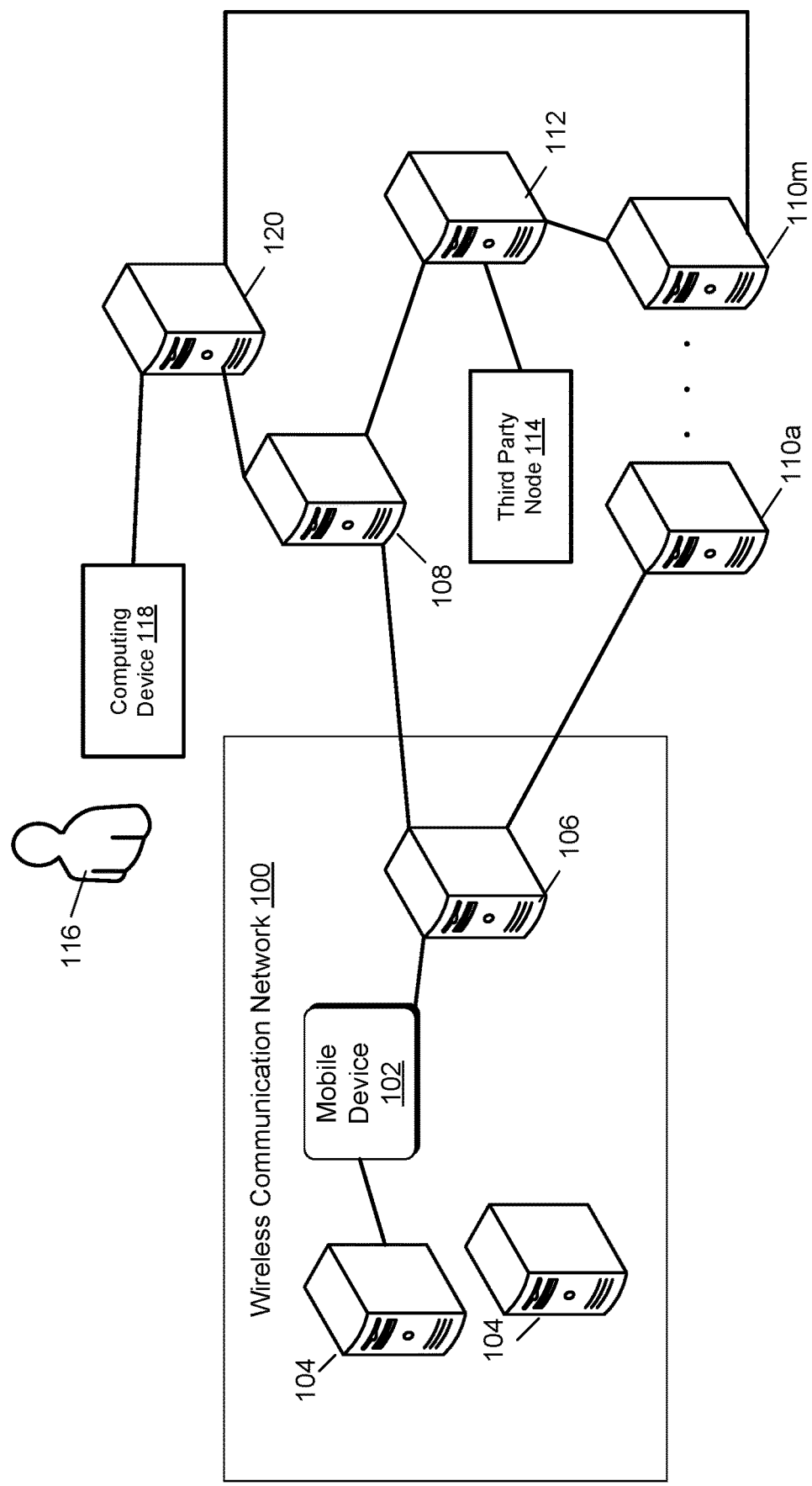
FIG. 1 schematically illustrates an arrangement that includes a wireless communication network, which includes a DNS caching server, in accordance with a configuration.

Described herein are techniques and an architecture for optimizing routing of client devices, e.g., mobile devices and computing devices, to network domains or sites, e.g., websites, provided by a network, e.g., the Internet, using DNS caching servers.

Communication networks, e.g., Internet Service Providers (ISPs), wireless communication networks, etc., that provide access to the Internet generally include sets of hundreds of servers configured as Domain Name System (DNS) caching servers. When a client device wishes to access a network site, e.g., a website, over a network, e.g., the Internet, the client device makes the request for access to a DNS caching server of a network via which the client device wishes to access the network site. For example, the client device may be a mobile device utilizing services in a wireless communication network. The mobile device may wish to access a website, e.g., www.example.com.

In a configuration, the caching DNS server creates a large set of possible DNS answers, e.g., IP addresses, for www.example.com. In order to accomplish this, the caching DNS server queries the root or authoritative DNS server, as well as third party public DNS servers that may include unique answers, e.g., IP addresses, for accessing www.example.com. Such third party public DNS servers are generally operated by ISPs, large network and information providers such as, for example, cable television companies, technology companies, etc.

The third party public DNS servers may thus provide multiple possible IP address answers to the DNS caching server's query regarding what IP address to use for www.example.com. In a configuration, the DNS caching server may also query the root DNS server and the third party DNS servers for IP addresses related to Internet Protocol version four (IPv4) and Internet Protocol version six (IPv6) IP addresses.

In a configuration, the DNS caching server may evaluate the IP addresses based upon performance data related to the IP addresses and the routing paths, e.g., network(s) and/or network nodes, to the IP addresses. The performance data may include latency with respect to accessing www.example.com, quality of service, loss of data packets, etc. Based upon the evaluation, the DNS caching service may select an IP address for use by the client device to access www.example.com. In a configuration, if no performance data is available for the IP addresses, the DNS caching server may select the first suitable IP address for the client device to avoid further delay in accessing www.example.com.

In a configuration, the DNS caching server may gather performance data. The DNS caching server may initiate a series of performance tests to the various IP addresses provided. Such tests may include discovering if the server providing www.example.com is available and may characterize the performance, e.g., latency between the DNS caching server and the server providing www.example.com. Examples of characterizing the performance may include using ping or SYN-ACK probing.

Upon gathering of the performance data, the DNS caching server may select an IP address and provide it to the client device. In a configuration, the client device may be configured to only handle either IPv4 or IPv6 IP addresses. Thus, the DNS caching server may select an IP address based upon whether the IP address is IPv4 or IPv6, in addition to the performance data. If the client device is configured to handle both IPv4 and IPv6 addresses, then the DNS caching server may select an IP address based only upon the performance data.

In a configuration, based upon the performance data, the DNS caching server may rank the IP addresses. The DNS caching server may provide an IP address to the requesting client device based upon the ranking of the IP addresses. Additionally, the DNS caching server may provide IP addresses to subsequent client devices that request access to www.example.com based upon the ranking of the IP addresses.

Since the performance data is time sensitive, i.e. performance generally changes over time, in a configuration, the DNS caching server may refresh the performance data and alter the rankings accordingly. In a configuration, the DNS caching server may refresh the performance in a range of every three to ten minutes.

As an example, IP addresses may be returned for routing a client device located in Seattle through one or more networks and/or servers in Portland, Oreg., to www.example.com. Other IP addresses may route the client device through one or more networks and/or servers in Los Angeles, Calif., to www.example.com. Depending on the traffic in Portland and Los Angeles, one IP address may provide lower latency than the other IP address to the client device for accessing www.example.com.

In a configuration, the DNS caching server may also gather heuristic data related to the various IP addresses. Such heuristic data may include, for example, time of day, day of the week, season, the DNS server that provided the IP address, etc. The heuristic data may be used in evaluating which IP address to use, e.g., may be used in conjunction with or as performance data. The heuristic data may also be used for other purposes.

In a configuration, all networks on the Internet are not optimally connected. This may be due to business optimization on the part of ISPs and generally do not reflect the best performance interests of client devices. Thus, in a configuration, the best IP address selected by the DNS caching server may include routing the client device through a third party node within a network-accessible service provider network, e.g., the Cloud. Thus, the DNS caching server may provide IP addresses to client devices that allow client devices to tunnel or proxy to the remote, third party node, e.g., a node in the Cloud and then on to an IP address for www.example.com. This may provide superior performance, e.g., latency savings, quality of service, lower data packet loss, etc.

For example, a client device located in Seattle may get a different set of performance metrics from a third party node that is optimally connected to many Internet networks in Portland. The Seattle node for the client device may have a best path latency directly to www.example.com of fifty milliseconds. However, routing the client device through a third party node through Portland may have a best path latency of 10 milliseconds to www.example.com. In such an example, the latency between Portland and Seattle is 10 milliseconds. Thus, if the Seattle node can tunnel or proxy the traffic to www.example.com via the third party node through one or more networks and/or servers in Portland, the total latency is only 20 milliseconds, which is a 30 millisecond improvement.

FIG. 1 schematically illustrates an arrangement that includes a wireless communication network 100 that provides services to a mobile device 102 (which may not necessarily be mobile) that register with the wireless communication network 100. Services provided within the wireless communication network 100 may include, for example, voice calling services (e.g. telephone calls), Internet access, messaging (e.g., short message service (SMS) messages, multi-media message service (MMS) messages, instant messaging (IM) messages, enhanced message service (EMS) messages, etc.), video services, etc. Such services are generally provided via various nodes implemented via servers 104 that mobile devices 102 access, i.e. the mobile devices register with the wireless communication network 100 via a server 104. For example, if the wireless communication network 100 is configured as a Global System for Mobile Communications (GMA) network, then one or more of the servers 104 may be a mobile switching station (MSS) server. If the wireless communication network includes an Internet Protocol (IP) Multimedia Subsystem (IMS) network, then one or more of the servers may comprise a telephony application server (TAS), a call session control function (CSCF) server and/or a breakout gateway control function (BGCF) server. In a configuration, when the wireless communication network 100 includes an IMS network, the IMS network may provide various services such as, for example, voice over long term evolution (VoLTE) service, video over long term evolution (ViLTE) service and/or rich communication services (RCS).

In a configuration, the mobile devices 102 may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, as well as desktop computers, devices configured as Internet of Things (IoT) devices, integrated devices combining one or more of the preceding devices, and/or the like. As such, the mobile devices 102 may range widely in terms of capabilities and features. For example, one of the mobile devices 102 may have a numeric keypad, a capability to display only a few lines of text and be configured to interoperate with only GSM networks. However, another of the mobile devices 102 (e.g., a smart phone) may have a touch-sensitive screen, a stylus, an embedded GPS receiver, and a relatively high-resolution display, and be configured to interoperate with multiple types of networks. The mobile devices may also include SIM-less devices (i.e., mobile devices that do not contain a functional subscriber identity module ("SIM")), roaming mobile devices (i.e., mobile devices operating outside of their home access networks), and/or mobile software applications.

In a configuration, the wireless communication network 100 may be configured as one of many types of networks and thus may communicate with mobile devices 102 using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like. In a configuration, as previously noted, the wireless communication network 100 may include an IMS network and thus, may provide various services such as, for example, voice over long term evolution (VoLTE) service, video over long term evolution (ViLTE) service and/or rich communication services (RCS).

In a configuration, the wireless communication network 100 may provide a service to the mobile device 102 that allows the mobile device 102 to access a network site, e.g., a website, via a network, e.g., the Internet. The wireless communication network 100 includes a DNS caching server 106 and generally includes multiple DNS caching servers 106. When the mobile device 102 wishes to access the network site, the mobile device makes the request for access to the DNS caching server 106. For example, the mobile device 102 may wish to access a website, e.g., www.example.com.

In a configuration, the caching DNS server 106 creates a large set of possible DNS answers, e.g., IP addresses, for www.example.com. In order to accomplish this, the caching DNS server 106 queries a root or authoritative DNS server(s) 108, as well as one or more third party public DNS servers 110a-110m (referred to collectively herein as 110), that may include unique answers, e.g., IP addresses, for accessing www.example.com at a server 112 hosting www.example.com. Such third party public DNS servers 110 are generally operated by ISPs, large network and information providers such as, for example, cable television companies, technology companies, etc.

The third party public DNS servers 110 may thus provide multiple possible IP address answers to the DNS caching server's query regarding what IP address to use to access www.example.com. Since the mobile device 102 may be configured based upon one or both of Internet Protocol version four (IPv4) and Internet Protocol version six (IPv6). In a configuration, the DNS caching server 106 may also query the root DNS server 108 and the third party DNS servers 110 for IP addresses related to IPv4 and IPv6 IP addresses.

In a configuration, the DNS caching server 106 may evaluate the IP addresses based upon performance data related to the IP addresses and the routing paths, e.g., network(s) and/or network nodes, to the IP addresses. The performance data may include latency with respect to accessing www.example.com via the IP addresses, quality of service, loss of data packets, etc. Based upon the evaluation, the DNS caching service 106 may select an IP address for use by the mobile device 102 to access www.example.com. In a configuration, if no performance data is available for the IP addresses, the DNS caching server 106 may select the first suitable IP address for the mobile device 102 to avoid further delay in accessing www.example.com.

In a configuration, the DNS caching server 106 may gather performance data related to accessing www.example.com via the IP addresses. The DNS caching server 106 may initiate a series of performance tests to the various IP addresses provided. Such performance tests may include discovering if the server 112 hosting www.example.com is available and characterizing the performance, e.g., latency between the DNS caching server 106 and the server 112 hosting www.example.com via the various IP addresses. Examples of characterizing the performance may include using ping or SYN-ACK probing.

Upon gathering of the performance data, the DNS caching server 106 may select an IP address and provide it to the mobile device 102. In a configuration, the mobile device 102 may be configured to only handle either IPv4 or IPv6 IP addresses. Thus, the DNS caching server 106 may select an IP address based upon whether the IP address is IPv4 or IPv6, in addition to the performance data. If the mobile device 102 is configured to handle both IPv4 and IPv6 addresses, then the DNS caching server 106 may select an IP address based only upon the performance data.

In a configuration, based upon the performance data, the DNS caching server 106 may rank the IP addresses. The DNS caching server 106 may provide an IP address to the mobile device 102 based upon the ranking of the IP addresses. Additionally, the DNS caching server 106 may provide IP addresses to subsequent mobile devices that request access to www.example.com via the wireless communication network 100 based upon the ranking of the IP addresses.

Since the performance data is time sensitive, i.e. performance generally changes over time, in a configuration, the DNS caching server 106 may refresh the performance data and alter the rankings accordingly. In a configuration, the DNS caching server 106 may refresh the performance in a range of every three to ten minutes.

As an example, IP addresses may be returned for routing the mobile device 102, which in this example is located in Seattle, through one or more networks and/or servers in Portland, Oreg., to www.example.com. Other IP addresses may route the mobile device 102 through one or more networks and/or servers in Los Angeles, Calif., to www.example.com. Depending on the network traffic in Portland and Los Angeles, one IP address may provide lower latency than the other IP address to the mobile device 102 for accessing www.example.com.

In a configuration, the DNS caching server 106 may also gather heuristic data related to the various IP addresses. Such heuristic data may include, for example, time of day, day of the week, season, the DNS server that provided the IP address, etc. The heuristic data may be used in evaluating which IP address to use, e.g., may be used in conjunction with or instead of performance data. The heuristic data may also be used for other purposes.

As is known, all networks on the Internet are not optimally connected. This may be due to business optimization on the part of ISPs and generally do not reflect the best performance interests of mobile devices. Thus, in a configuration, the best IP address selected by the DNS caching server 106 may include routing the mobile device through a third party node 114 within a network-accessible service provider network, e.g., the Cloud. Thus, the DNS caching server 106 may provide an IP address to the mobile device 102 that allows the mobile device to tunnel or proxy to the remote, third party node 114, e.g., a node in the Cloud and then on to the IP address for www.example.com. This may provide superior performance, e.g., latency savings, quality of service, lower data packet loss, etc.

For example, the mobile device 102 located in Seattle may get a different set of performance metrics from the third party node 114 that is optimally connected to many Internet networks in Portland. The Seattle node of the wireless communication network 100 with which the mobile device 102 is registered for service may have a best path latency directly to www.example.com of fifty milliseconds based upon an IP address. However, routing the mobile device 102 through the third party node 114 through Portland may have a best path latency of 10 milliseconds to www.example.com based upon either the same IP address or a different IP address. In such an example, the latency between Portland and Seattle is 10 milliseconds. Thus, if the Seattle node can tunnel or proxy the traffic of the mobile device 102 (and possibly other mobile devices) to www.example.com via the third party node 114 through one or more networks and/or servers in Portland, the total latency is only 20 milliseconds, which is a 30 millisecond improvement.

While the present configurations and examples have been discussed with respect to mobile devices within a wireless communication network, it should be appreciated that client devices may also be in the form of computing devices that wish to access www.example.com via the wireless communication network 100 or networks other than the wireless communication network 100. Thus, the configurations and examples described herein are also applicable to such scenarios. For example, a user 116 may use a computing device 118 within a home or business to request to access www.example.com. The request may be provided to a DNS caching server 120 (or DNS caching server 106) that performs the various functions described herein. In a configuration, the DNS caching server 120 may be located within a router.

Figure 2:
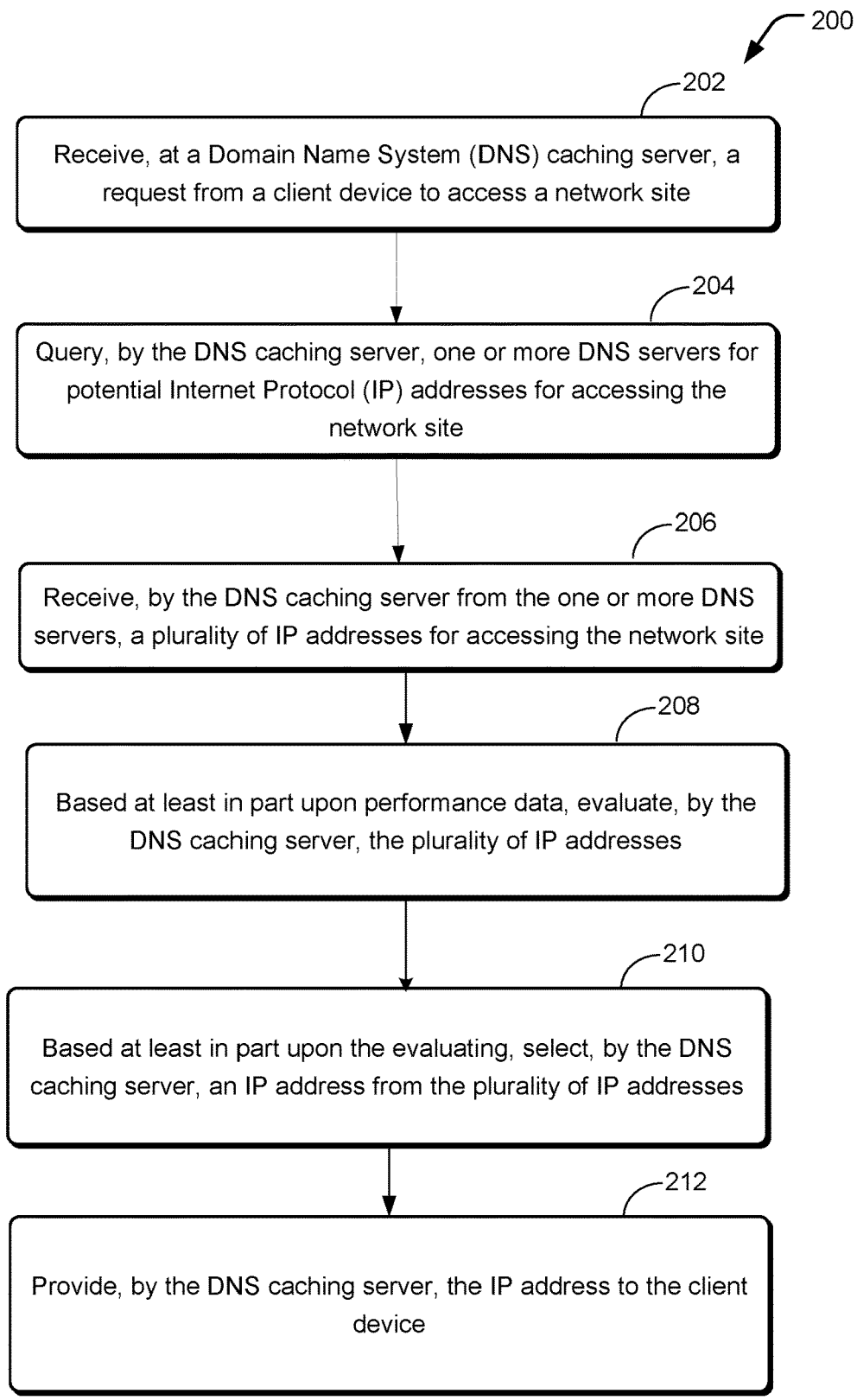
FIG. 2 is a flowchart illustrating an example method of optimizing routing of client devices to network domains or sites using the DNS caching server of FIG. 1, in accordance with a configuration.

FIG. 2 is a flowchart illustrating a method 200 of optimizing routing of client devices, e.g., mobile devices 102 and computing devices 118, to network domains or sites, e.g., websites, provided by a network, e.g., the Internet, using DNS caching servers, e.g., DNS caching server 106, in a wireless communication network, e.g., wireless communication network 100 of FIG. 1. As illustrated, at block 202, a request is received by a DNC caching server from a client device to access a network site. At block 204, the DNS caching server queries one or more DNS servers for potential Internet Protocol (IP) addresses for accessing the network site. At block 206, the DNS caching server receives, from the one or more DNS caching servers, a plurality of IP addresses for accessing the network site. At block 208, based at least in part upon performance data, the DNS caching server evaluates the plurality of IP addresses. At block 210, based at least in part upon the evaluating, the DNS caching server selects an IP address from the plurality of IP addresses. At block 212, the DNS caching server provides the IP address to the client device.

Figure 3:
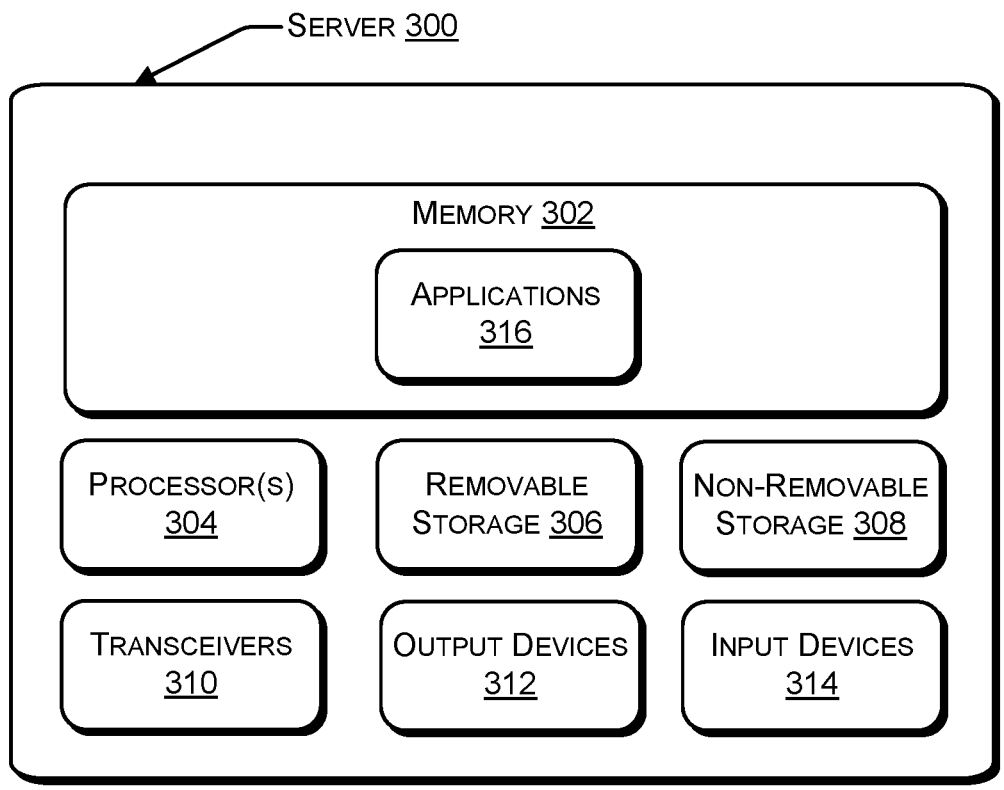
FIG. 3 illustrates a component level view of a server configured for use in the arrangement of FIG. 1 to provide various services of the wireless communication network of FIG. 1.

FIG. 3 schematically illustrates a component level view of a server 300, e.g., servers 104, DNS caching server 106, etc., configured for use within a network, e.g., wireless communication network 100, in order to provide various services within the wireless communication network, according to the techniques described herein. The server 300 may be located in, for example, a radio network controller (RNC) of the wireless communication network 100 or a gateway of the wireless communication network 100. Additionally, the server 300 may be a separate entity located separately from the RNC.

As illustrated, the server 300 comprises a system memory 302. Also, the server 300 includes processor(s) 304, a removable storage 306, a non-removable storage 308, transceivers 310, output device(s) 312, and input device(s) 314.

In various implementations, system memory 302 is volatile (such as RAM), non-volatile (such as ROM, flash memory, etc.) or some combination of the two. In some implementations, the processor(s) 304 is a central processing unit (CPU), a graphics processing unit (GPU), or both CPU and GPU, or any other sort of processing unit. System memory 302 may also include applications 316 that allow the server to perform various functions. For example, the applications 316 may allow the server 300 to perform functions described herein with respect to obtaining, evaluating, and selecting IP addresses received from DNS servers.

The server 300 may also include additional data storage devices (removable and/or non-removable) such as, for example, magnetic disks, optical disks, or tape. Such additional storage is illustrated in FIG. 3 by removable storage 306 and non-removable storage 308.

Non-transitory computer-readable media may include volatile and nonvolatile, removable and non-removable tangible, physical media implemented in technology for storage of information, such as computer readable instructions, data structures, program modules, or other data. System memory 302, removable storage 306 and non-removable storage 308 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 300. Any such non-transitory computer-readable media may be part of the server 300.

In some implementations, the transceivers 310 include any sort of transceivers known in the art. For example, the transceivers 310 may include wired communication components, such as an Ethernet port, for communicating with other networked devices. Also or instead, the transceivers 310 may include wireless modem(s) to may facilitate wireless connectivity with other computing devices. Further, the transceivers 310 may include a radio transceiver that performs the function of transmitting and receiving radio frequency communications via an antenna.

In some implementations, the output devices 312 include any sort of output devices known in the art, such as a display (e.g., a liquid crystal display), speakers, a vibrating mechanism, or a tactile feedback mechanism. Output devices 312 also include ports for one or more peripheral devices, such as headphones, peripheral speakers, or a peripheral display.

In various implementations, input devices 314 include any sort of input devices known in the art. For example, input devices 314 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A method comprising:
   receiving, at a Domain Name System (DNS) caching server of a network service, a request to access a network site from a client device of the network service;
   querying, by the DNS caching server, a plurality of DNS servers for potential Internet Protocol (IP) addresses for accessing the network site, a public DNS server of the plurality of DNS servers being a third party public DNS server that is not associated with the network service of the client device and a root DNS server of the plurality of DNS servers being a root DNS server associated with the network service of the client device;
   receiving, by the DNS caching server from the plurality of DNS servers, a plurality of IP addresses for accessing the network site including:
      receiving, from the public DNS server, a first IP address of the plurality of IP addresses for a first route to the network site through an intermediate third party node of a network accessible service provider network not associated with the network service of the client device; and receiving, from the root DNS server, a second IP address of the plurality of IP addresses for a second route to the network site without third party nodes not associated with the network service of the client device;

based at least in part upon performance data, evaluating, by the DNS caching server, the plurality of IP addresses;

based at least in part upon the evaluating, selecting, by the DNS caching server, an IP address from the plurality of IP addresses comprising:

determining, based at least in part upon the evaluating, that the first route to the network site has better performance data than the second route to the network site; and selecting the first IP address for the first route to the network site through the intermediate third party node; and providing, by the DNS caching server, the first IP address to the client device.

2. The method of claim 1, further comprising:
receiving, at the Domain Name System (DNS) caching server, a second request from a second client device to access a second network site;
querying, by the DNS caching server, the plurality of DNS servers for second potential Internet Protocol (IP) addresses for accessing the second network site;
receiving, by the DNS caching server from the plurality of DNS servers, a second plurality of IP addresses for accessing the second network site;
based at least in part upon second performance data, evaluating, by the DNS caching server, the second plurality of IP addresses;
based at least in part upon the evaluating the second plurality of IP addresses, selecting, by the DNS caching server, a second selected IP address from the second plurality of IP addresses, wherein selecting the second selected IP address comprises:
selecting an IP address of the second plurality of IP addresses.

3. The method of claim 1, wherein evaluating the plurality of IP addresses comprises:
gathering the performance data related to the plurality of IP addresses.

4. The method of claim 3, wherein gathering performance data related to the plurality of IP addresses comprises:
determining, by the DNS caching server, (i) if the network site is available and (ii) a latency between the DNS caching server and each IP address of the plurality of IP addresses.

5. The method of claim 3, further comprising:
periodically refreshing the performance data.

6. The method of claim 5, wherein periodically refreshing the performance data comprises:
periodically refreshing the performance data in a range of 3 to ten minutes.

7. The method of claim 1, further comprising:
generating, by the DNS caching server, heuristic data related to the plurality of IP addresses.

8. The method of claim 7, wherein evaluating the plurality of IP addresses comprises:
evaluating the plurality of IP addresses based at least in part on the heuristic data.

9. The method of claim 1, wherein:
the plurality of IP addresses comprise Internet Protocol version 4 (IPv4) IP addresses and Internet Protocol version 6 (IPv6) IP addresses; and
selecting the first IP address from the plurality of IP addresses comprises selecting the first IP address based at least in part upon configuration of the client for either IPv4 or IPv6.

10. The method of claim 9, wherein:
the client is configured for both IPv4 and IPv6; and
selecting the first IP address from the plurality of IP addresses comprises selecting either (i) an IPv4 IP address or (i) an IPv6 IP address based at least in part upon evaluating the IPv4 and IPv6 addresses.

11. The method of claim 1, wherein the second route is a best route not including a tunnel or proxy thorough nodes not associated with the network service of the client device and the first route including a tunnel or proxy thorough the intermediate third party node.

12. An apparatus comprising:
one or more processors; and
a non-transitory storage medium including instructions stored in the non-transitory storage medium, the instructions being executable by the one or more processors to:
receive a request to access a network site from a client device of a network service;
query a plurality of Domain Name System servers for potential Internet Protocol (IP) addresses for accessing the network site, a public DNS server of the plurality of DNS servers being a third party public DNS server that is not associated with the network service of the client device and a root DNS server of the plurality of DNS servers being a root DNS server associated with the network service of the client device;
receive, from the plurality of DNS servers, a plurality of IP addresses for accessing the network site including:
receiving, from the public DNS server, a first IP address of the plurality of IP addresses for a first route to the network site through an intermediate third party node of a network accessible service provider network not associated with the network service of the client device, and
receiving, from the root DNS server, a second IP address of the plurality of IP addresses for a second route to the network site without third party nodes not associated with the network service of the client device;
based at least in part upon performance data, evaluate the plurality of IP addresses;
based at least in part upon the evaluating, select an IP address from the plurality of IP addresses comprising:
determining, based at least in part upon the evaluating, that the first route to the network site has better performance data than the second route to the network site; and
selecting the first IP address for the first route to the network site through the intermediate third party node; and
provide the first IP address to the client.

13. The apparatus of claim 12, wherein the instructions are further executable by the one or more processors to:
query the plurality of Domain Name System servers for second potential Internet Protocol (IP) addresses for accessing a second network site;
receive, from the plurality of DNS servers, a second plurality of IP addresses for accessing the second network site;

based at least in part upon second performance data, evaluate the second plurality of IP addresses;

based at least in part upon the evaluating of the second plurality of IP addresses, select a second selected IP address from the second plurality of IP addresses, wherein selecting the second selected IP address includes:

selecting an IP address of the second plurality of IP addresses.

14. The apparatus of claim 12, wherein the instructions are further executable by the one or more processors to:

gather the performance data related to the plurality of IP addresses.

15. The apparatus of claim 14, wherein the instructions are further executable by the one or more processors to gather performance data related to the plurality of IP addresses by:

determining (i) if the network site is available and (ii) a latency between the DNS caching server and each IP address of the plurality of IP addresses.

16. The apparatus of claim 14, wherein the instructions are further executable by the one or more processors to:

periodically refresh the performance data.

17. The apparatus of claim 12, wherein the instructions are further executable by the one or more processors to:

generate heuristic data related to the plurality of IP addresses: and evaluate the plurality of IP addresses based at least in part on the heuristic data.

18. The apparatus of claim 12, wherein:

the plurality of IP addresses comprise Internet Protocol version 4 (IPv4) IP addresses and Internet Protocol version 6 (IPv6) IP addresses; and the instructions are further executable by the one or more processors to select the first IP address from the plurality of IP addresses comprises selecting the first IP address based at least in part upon configuration of the client for at least one of (i) IPv4 or (ii) IPv6.

19. The apparatus of claim 12, wherein the second route is a best route not including a tunnel or proxy thorough nodes not associated with the network service of the client device and the first route including a tunnel or proxy thorough the intermediate third party node.

20. The apparatus of claim 12, wherein the network service is a wireless communication network service.

* * * * *